(12) United States Patent
Kishigami et al.

(10) Patent No.: US 9,098,728 B2
(45) Date of Patent: Aug. 4, 2015

(54) VIEWING APPARATUS AND COMPUTER-READABLE MEDIUM

(75) Inventors: Yasuo Kishigami, Kodaira (JP); Chie Fukuda, Tokyo (JP); Tomoko Yamazaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 423 days.

(21) Appl. No.: 13/366,513

(22) Filed: Feb. 6, 2012

(65) Prior Publication Data

US 2012/0206588 A1    Aug. 16, 2012

(30) Foreign Application Priority Data

Feb. 15, 2011  (JP) ................................. 2011-029289

(51) Int. Cl.
*G06F 21/84* (2013.01)
*H04N 7/18* (2006.01)

(52) U.S. Cl.
CPC ...................................... *G06F 21/84* (2013.01)

(58) Field of Classification Search
None
See application file for complete search history.

(56) References Cited

U.S. PATENT DOCUMENTS

| | | | | |
|---|---|---|---|---|
| 6,912,660 B1* | 6/2005 | Petrogiannis | ................. | 713/181 |
| 7,408,600 B2 | 8/2008 | Yata et al. | | |
| 7,551,780 B2* | 6/2009 | Nudd et al. | ................. | 382/190 |
| 2002/0191002 A1* | 12/2002 | Friedrich et al. | ............. | 345/632 |
| 2006/0115082 A1* | 6/2006 | Kevenaar et al. | ............. | 380/216 |
| 2006/0165256 A1* | 7/2006 | Carr et al. | ...................... | 382/100 |
| 2008/0149713 A1* | 6/2008 | Brundage | ...................... | 235/435 |
| 2009/0303547 A1* | 12/2009 | Kurihara | ...................... | 358/3.28 |
| 2010/0052852 A1* | 3/2010 | Mohanty | ...................... | 340/5.83 |
| 2011/0063685 A1* | 3/2011 | Suzuki | ......................... | 358/3.28 |
| 2013/0077817 A1* | 3/2013 | Naparstek et al. | ............. | 382/100 |
| 2014/0200929 A1* | 7/2014 | Fitzgerald et al. | ................. | 705/4 |

FOREIGN PATENT DOCUMENTS

| | | |
|---|---|---|
| JP | 2002-300561 A | 10/2002 |
| JP | 2004-152048 A | 5/2004 |
| JP | 2006-276569 A | 10/2006 |
| JP | 2007-003745 A | 1/2007 |
| JP | 2009-169148 A | 7/2009 |

OTHER PUBLICATIONS

Machine level English translation of JP2007003745.*
Machine level English translation of JP2006276569.*
(Continued)

*Primary Examiner* — Dave Czekaj
*Assistant Examiner* — Mohammad J Rahman
(74) *Attorney, Agent, or Firm* — Holtz, Holtz, Goodman & Chick PC

(57) ABSTRACT

Disclosed is a viewing apparatus including a transmission unit having light transparency, through which an image is viewed, the viewing apparatus comprising: an identification information obtaining unit which obtains identification information to identify a user of the viewing apparatus; and a processor which performs: authentication processing which authenticates the user based on the identification information; judgment processing which judges whether a hidden image included in advance in the image can be viewed or not, based on a result of the authentication processing; and adjustment processing which adjusts light passing through the transmission unit to switch whether the hidden image can be viewed or not, based on a result of the judgment processing.

20 Claims, 7 Drawing Sheets

(56) References Cited

OTHER PUBLICATIONS

Japanese Office Action dated Aug. 6, 2013 (and English translation thereof) in counterpart Japanese Application No. 2011-029289.

Japanese Office Action dated Jan. 29, 2013 (and English translation thereof) in counterpart Japanese Application No. 2011-029289.

* cited by examiner

VIEWING APPARATUS AND COMPUTER-READABLE MEDIUM

CROSS-REFERENCE TO RELATED APPLICATIONS

This application is based upon and claims the benefit of priority from the prior Japanese Patent Application No. 2011-029289, filed on Feb. 15, 2011, the entire contents of which are incorporated herein by reference.

BACKGROUND OF THE INVENTION

1. Field of the Invention

The present invention relates to a viewing apparatus and a computer-readable medium.

2. Description of Related Art

In image viewing, an adjustment of light reaching to eyes of a user from an image (e.g., polarization) is performed. A method has been known in which a hidden image provided in an image in advance emerges by the adjustment so that the image is visible. This method may be applied so that a hidden image included in the image displayed on the image display apparatus can be viewed only when an exclusive image display apparatus is combined with a polarization lens. There is a display system to provide the viewing of a hidden image only to a user having a polarization lens (e.g., see Japanese Patent Application Laid-Open Publication No. 2009-169148).

However, the conventional display system has been insufficient to limit users who can view the hidden image. The reason is that even an unauthorized user who is not permitted to view a hidden image happens to be able to view the hidden image by obtaining a polarization lens by some ways.

Furthermore, in the case of the conventional display system, an image including a hidden image must be displayed by an exclusive image display apparatus. This has made it impossible to handle hidden images included in images on other media, such as an image printed on paper, not handled by the exclusive image display apparatus.

SUMMARY OF THE INVENTION

It is an objective of the present invention to provide a viewing apparatus and a computer-readable medium by which only legitimate users can view a hidden image, without being limited by an image medium.

According to an aspect of the present invention, there is provided a viewing apparatus comprising:

a transmission unit having light transparency;

an identification information obtaining unit which obtains identification information to identify a user of the viewing apparatus; and a processor which performs:

authentication processing which authenticates the user based on the identification information;

judgment processing which judges whether a hidden image included in advance in the image can be viewed or not, based on a result of the authentication processing; and adjustment processing which adjusts light passing through the transmission unit to switch whether the hidden image can be viewed or not, based on a result of the judgment processing.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENT

A specific embodiment of the present invention will be described hereinbelow with reference to the drawings. However, the scope of the invention is not limited to the shown example.

A viewing apparatus 1 of this embodiment has a transmission unit 10 through which an image can be viewed.

Figure 1:
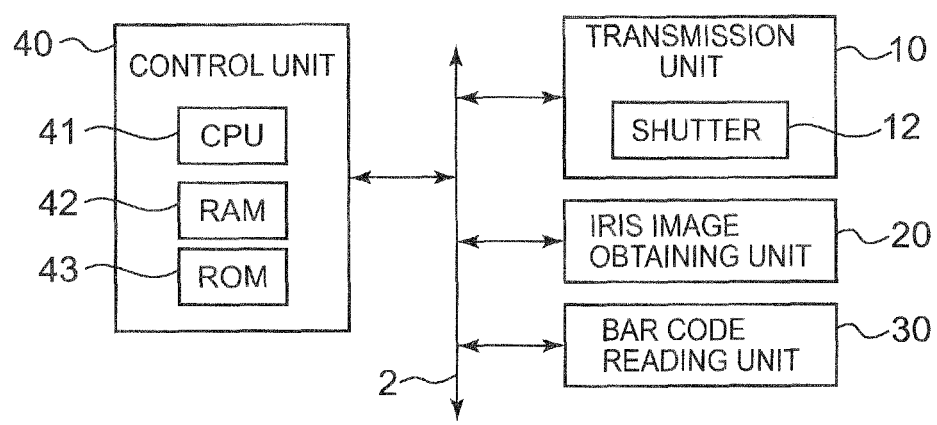
FIG. 1 is a block diagram illustrating a main configuration of a viewing apparatus according to one embodiment of the present invention.
Figure 2:
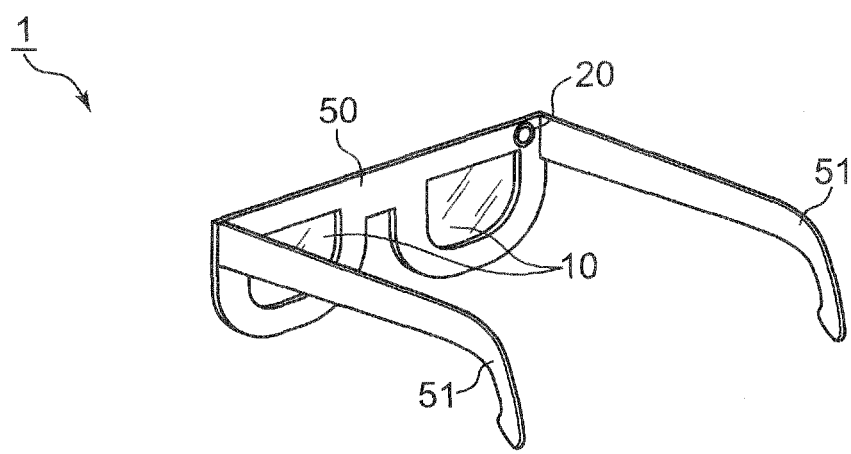
FIG. 2 is a perspective view illustrating the viewing apparatus according to one embodiment of the present invention.
Figure 3:
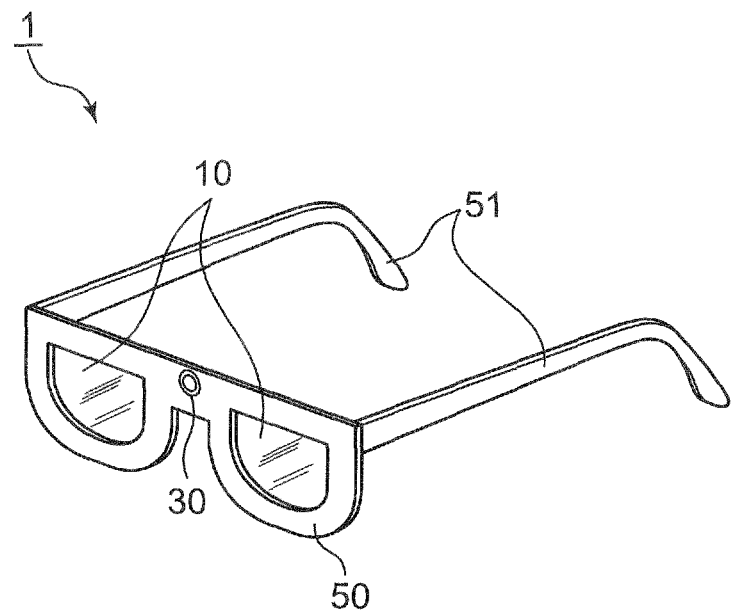
FIG. 3 is a perspective view illustrating the viewing apparatus according to one embodiment of the present invention from a different angle from that in FIG. 2.

FIG. 1 is a block diagram illustrating the main configuration of the viewing apparatus 1 according to one embodiment of the present invention. FIG. 2 and FIG. 3 are perspective views illustrating the viewing apparatus 1 according to one embodiment of the present invention.

As shown in FIG. 1, the viewing apparatus 1 includes: the transmission unit 10; an iris image obtaining unit 20; a bar code reading unit 30; and a control unit 40. These components are connected by a bus 2.

As shown in FIG. 2 and FIG. 3, the respective parts of the viewing apparatus 1 are held by a frame 50. The frame 50 has a shape of an eyeglasses frame having eyeglass lenses of two transmission units 10. The control unit 40 and the bus 2 are provided inside of the frame 50.

When a user wears the viewing apparatus 1 by placing temple units 51 of the frame 50 on his or her ears, the two transmission units 10 are held just in front of the user eyes. Thus, the user can view the outside in front of his or her eyes via the two transmission units 10. For example, the user can view an image on a medium (e.g., an image formed on a paper).

The frame 50 functions as a holding unit to hold the transmission units 10 just in front of the eyes of the user.

In the following, with regard to the transmission unit 10 held by the frame 50, the side to which the temple units extend will be referred to as an inner side, and the opposite side thereof will be referred to as an outer side of the viewing apparatus 1.

The term "image" is not limited to an image printed on paper and may include other images (e.g., characters, photograph, line segment, geometric pattern, any other images), as well as a combination of a part of or all of these images.

Figure 4:
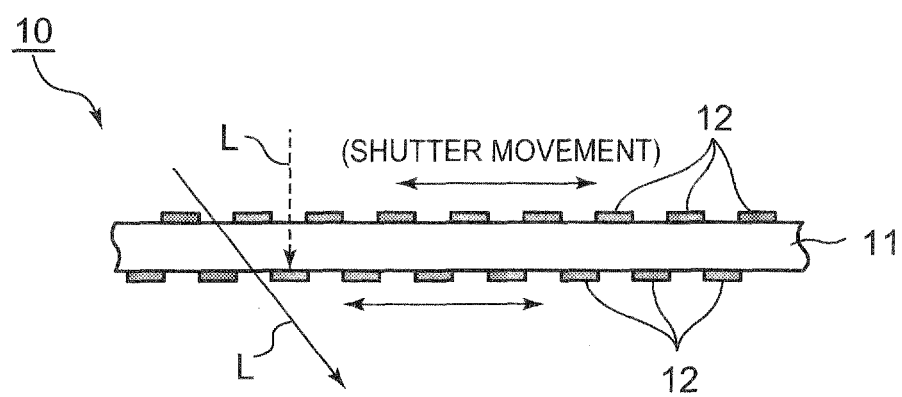
FIG. 4 illustrates an example of the detailed configuration of a transmission unit.

FIG. 4 illustrates an example of the detailed configuration of the transmission unit 10.

The transmission unit 10 has: a transmission plate 11 that is a transmissive plate-like member; and a shutter 12 for adjusting the light passing through the transmission unit 10. As shown in FIG. 4, the shutter 12 is a grid-like member having a pattern whose position can be changed with respect to the transmission plate 11. In this embodiment, the two shutters 12 are provided between user eyes and the outside so as to be placed on the path of the light L passing through the transmission unit 10. By the positions of the two shutters 12, the amount of the light L passing through the transmission unit 10, the angle of the light L, or both of the amount and the angle is adjusted. The positions of the shutters 12 are adjusted by the control unit 40.

The iris image obtaining unit 20 obtains, as identification information used to identify the user of the viewing apparatus 1, a picked-up image obtained by picking up a user iris.

The iris image obtaining unit 20 of this embodiment has a picking up element such as a Complementary Metal Oxide Semiconductor (CMOS) image sensor. This picking up element is used to pick up a user iris. As shown in FIG. 2, the iris image obtaining unit 20 is provided at the inner side of the viewing apparatus 1 so that the picking up element faces an eye of the user wearing the viewing apparatus 1.

The iris image obtaining unit 20 obtains a picked-up image such as an iris of a user eye.

The bar code reading unit 30 reads the bar code B formed on a medium (e.g., paper) to obtain information.

The bar code reading unit 30 of this embodiment has a picking up element such as a CMOS image sensor. The picking up element picks up and read a two-dimensional bar code, such as a QR code (registered trademark). As shown in FIG. 3, the bar code reading unit 30 is provided facing the outer side of the viewing apparatus 1.

The bar code reading unit 30 functions as a reading unit to read a bar code.

The control unit 40 controls the operations of the respective parts of the viewing apparatus 1. The control unit 40 performs various processing.

The control unit 40 includes: a CPU 41, a RAM 42, and a ROM 43.

The CPU 41 cooperates with a program stored in the ROM 43 to perform, based on the program or data developed in the RAM 42, the control of the operation of the viewing apparatus 1 or various processing.

The RAM 42 stores data developed by the processing by the CPU 41 or data temporarily generated by the processing.

The ROM 43 stores data or a program read by the CPU 41. The ROM 43 stores the image data of an iris of the user of the viewing apparatus 1, which has been picked up in advance. A user whose iris image data is stored in the ROM 43 is permitted to view a hidden image in advance. The ROM 43 can store image data of the irides of a plurality of users.

The ROM 43 functions as a storage unit to store the images of irides of users who are permitted to view a hidden image in advance.

Although not shown in FIG. 1, the viewing apparatus 1 includes: a power source unit for supplying power for the operation of the respective parts; a power switch for switching the ON/OFF of the operation of the viewing apparatus 1; and an authentication switch for showing the user of the viewing apparatus 1 and the start/end of the viewing of a hidden image by the user, for example.

The following unit will describe, from among the processing performed by the CPU 41, an authentication processing related to the viewing of a hidden image (hereinafter simply referred to as an authentication processing). The description will be provided based on an assumption that the user operates the authentication switch while wearing the viewing apparatus 1.

After the start of the authentication processing, the CPU 41 firstly allows the iris image obtaining unit 20 to operate, thereby obtaining a picked-up image of a user iris.

Next, the CPU 41 performs an iris recognition processing. Specifically, the CPU 41 reads the iris image data stored in the ROM 43. Then, the CPU 41 judges whether or not the image data matches or is similar to the picked-up image of the user iris obtained by the iris image obtaining unit 20. The matching/similarity judgment between the image data and the picked-up image can be carried out by a known image similarity judgment processing and thus will not be described further.

The iris image obtaining unit 20 functions as an identification information obtaining unit to obtain identification information for identifying the user of the viewing apparatus.

The CPU 41 functions as an authentication unit to authenticate the user based on the identification information.

When the iris recognition processing result shows that none of the iris image data stored in the ROM 43 matches or is similar to the image picked up by the iris image obtaining unit 20 (iris recognition failure), then the CPU 41 ends the processing as an authentication failure. Specifically, the CPU 41 judges that the current user is not permitted to view a hidden image.

When the iris recognition processing result shows that one of the iris image data stored in the ROM 43 matches or is similar to the image picked up by the iris image obtaining unit 20 (iris recognition success), then the CPU 41 allows the bar code reading unit 30 to operate to obtain the information from the bar code B formed in a medium.

The bar code B includes the user information and an adjustment parameter. The CPU 41 obtains user information and an adjustment parameter via the bar code reading unit 30.

The user information shows a user who is permitted in advance to view a hidden image formed in the medium including the bar code B. The number of users shown by the user information may be single or plural.

The bar code reading unit 30 functions as a user information obtaining unit that obtains the user information showing a user who is permitted in advance to view a hidden image.

The user information is provided as information that can be compared to the user corresponding to the iris image data stored in the ROM 43. For example, when plurality of iris image data stored in the ROM 43 corresponds to a plurality of users (the first user and the second user), the user information shows whether one or a plurality of or all of the plurality of users can view a hidden image in a medium. When the user information includes the first user, the second user, or both of the first and second users, the user(s) included in the information can view the hidden image in the medium. When the user information does not include information for the first user or the second user, the first user and the second user cannot view the hidden image in the medium.

The adjustment parameter is a parameter used to adjust the light in the transmission unit 10 in order to allow the hidden image to be visible. In this embodiment, the adjustment parameter includes information related to the position adjustment of the shutter 12. Based on the adjustment parameter, the CPU 41 of the control unit 40 allows the shutter 12 to operate.

The adjustment parameter also provides the correspondence between the user who is permitted in advance to view the hidden image based on the user information and the information for the position adjustment of the shutter 12. The adjustment parameter functions as correspondence information showing the correspondence between the user and the light angle adjusted by the adjustment unit.

The user information and the adjustment parameter of this embodiment exist as encrypted information included in the bar code B. The CPU 41 decrypts the encrypted user information and adjustment parameter to obtain the user information and adjustment parameter.

In this embodiment, all pieces of the user information and the adjustment parameter are encrypted. However, a part of these pieces of data may be encrypted. For example, header information may be written as a plain text and an actual data part may be encrypted.

After the obtainment of the user information and adjustment parameter, the CPU 41 performs a verification processing to judge whether the user shown by the iris image data authenticated by the iris recognition processing is included in the user information or not. If the verification processing result shows that the user shown by the iris image data authenticated by the iris recognition processing is not included in the user information (verification failure), then the CPU 41 ends the processing as an authentication failure. In the case of the authentication failure, the adjustment of the light L passing through the transmission unit 10 for allowing the hidden image to be visible is not performed.

On the other hand, when the verification processing judges that the user shown by the iris image data authenticated by the iris recognition processing is included in the user information (verification success), then the CPU 41 judges that the user authentication based on the picked-up image of the user iris, the image data in the ROM 43, and the user information in the bar code B has succeeded (authentication success). In the case of the authentication success, the CPU 41 performs the adjustment of the light L passing through the transmission unit 10, based on the adjustment parameter obtained from the bar code B.

Figure 5A:
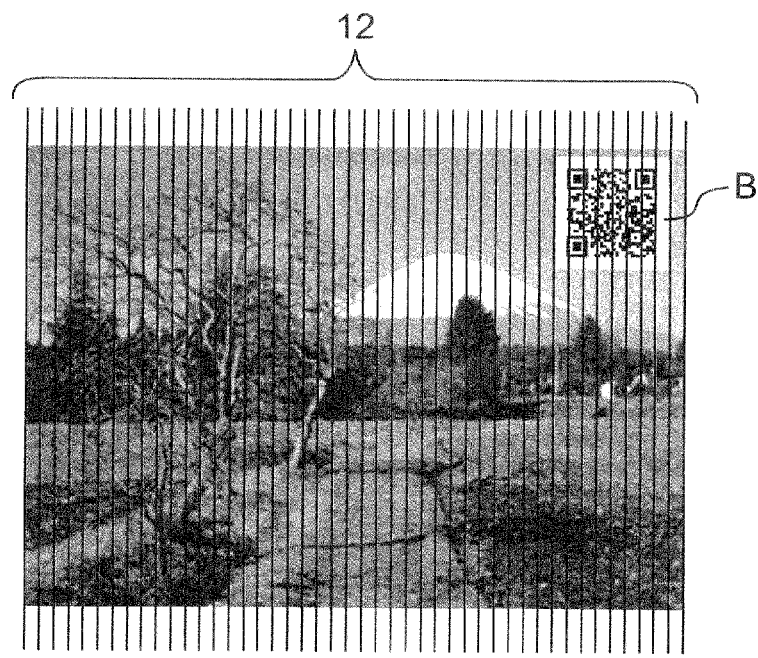
FIG. 5A illustrates an example of a visible image before and after the adjustment of light passing through the transmission unit, and shows an example of how an image on a medium before the adjustment is performed by a CPU of the light passing through the transmission unit can be visually seen.
Figure 5B:
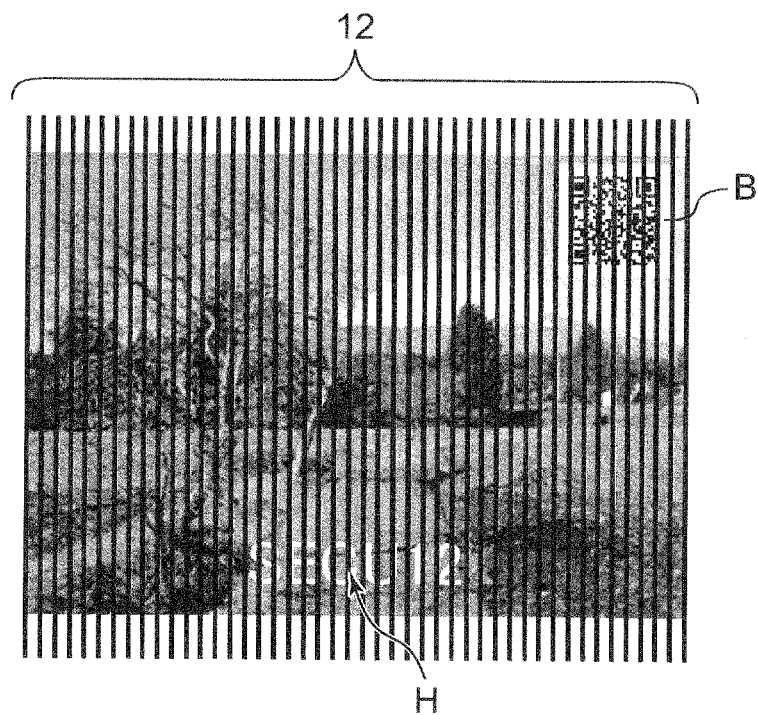
FIG. 5B illustrates an example of how the image shown in FIG. 5A can be visually seen after the adjustment is performed by the CPU of the light passing through the transmission unit.

FIG. 5A and FIG. 5B illustrate an example of a visible image before and after the adjustment of the light L passing through the transmission unit 10. FIG. 5A illustrates an example of how an image on a medium can be viewed before the adjustment of the light L passing through the transmission unit 10 is performed by the CPU 41. FIG. 5B illustrates an example of how the image shown in FIG. 5A can be viewed after the adjustment of the light L passing through the transmission unit 10 is performed by the CPU 41.

As shown in FIG. 5A, prior to the adjustment of the light L passing through the transmission unit 10 performed by the CPU 41, the user cannot view the hidden image H shown in FIG. 5B on the medium. After the adjustment of the light L passing through the transmission unit 10 performed by the CPU 41 on the other hand, the hidden image H formed in advance in the image shown in FIG. 5A can be viewed as shown in FIG. 5B.

When the verification processing results in a verification success, then the CPU 41 allows the shutter 12 to operate based on the adjustment parameter obtained from the bar code B and performs the adjustment of the light L passing through the transmission unit 10. This adjustment allows, as shown in the examples shown in FIG. 5A and FIG. 5B, the hidden image H included in the image on the medium including the bar code B to be visible. As a result, the user of the viewing apparatus 1 can view the hidden image.

As described above, the CPU 41 functions as a judgment unit that judges whether the hidden image included in advance in the image can be viewed or not based on the authentication result by the authentication unit.

The CPU 41 also functions as an adjustment unit that adjusts, based on the judgment result by the judgment unit, the light passing through the transmission unit to switch the status of the hidden image to a visible status or a not-visible status.

The user can end the authentication processing by performing a predetermined end processing in the middle of the authentication processing or after the viewing of the hidden image. The predetermined end processing unit is, for example, an operation to turn OFF the power source or an instruction via the authentication switch to end the viewing of the hidden image.

Figure 6:
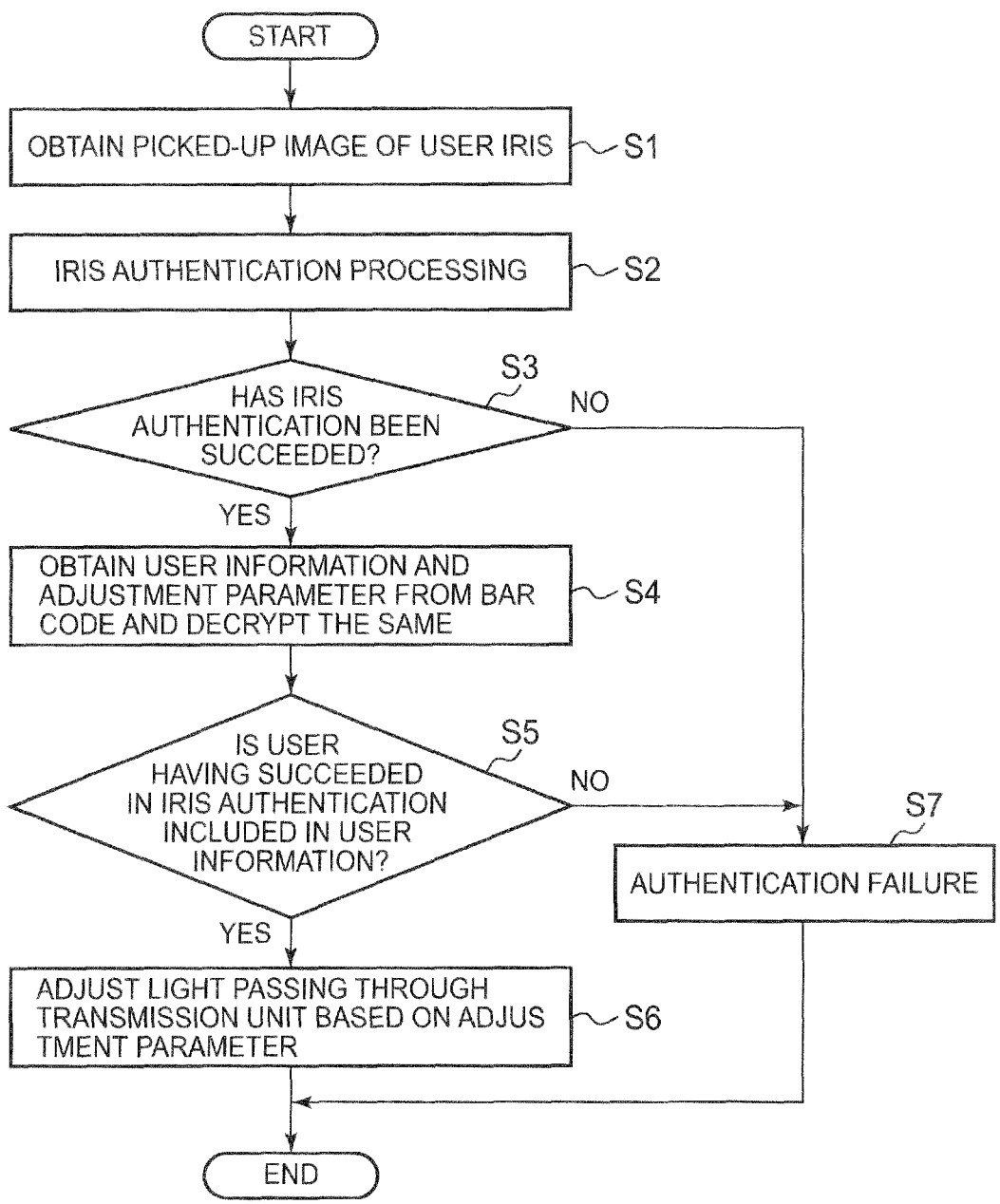
FIG. 6 is a flowchart illustrating an example of the flow of an authentication processing.

The following unit will describe the flow of the authentication processing with reference to the flowchart of FIG. 6.

The CPU 41 firstly operates the iris image obtaining unit 20 to obtain the picked-up image of user iris (Step S1). Next, the CPU 41 performs the iris recognition processing (Step S2) and judges whether the iris recognition processing results in the iris recognition success or not (Step S3).

In the case of the iris recognition success (Step S3: YES), then the CPU 41 operates the bar code reading unit 30 to obtain and decrypt the user information and the adjustment parameter based on the bar code B formed in the medium (Step S4). Then, the CPU 41 judges whether the user shown by the iris image data authenticated by the iris recognition processing is included in the user information or not (i.e., whether the result is a verification success or not) (Step S5).

When the result is a verification success (Step S5: YES), then the CPU 41 judges as an authentication success and performs the adjustment of the light L passing through the transmission unit 10 based on the adjustment parameter obtained from the bar code B (Step S6). When Step S3 results in an iris recognition failure (Step S3: NO) or when Step S5 results in a verification failure (Step S5: NO) on the other hand, then the CPU 41 judges as an authentication failure (Step S7) and ends the processing.

When the predetermined end processing is performed after the processing of Step S6 or in the middle of the authentication processing, the authentication processing ends.

As described above, according to the viewing apparatus 1 of this embodiment, when the CPU 41 judges an authentication success including the result of the iris recognition processing, the shutter 12 is operated to adjust the light L passing through the transmission unit 10. This adjustment can allow the hidden image H provided in advance in the image on the medium to be visible.

As a result, the hidden image H is able to be viewed only by a legitimate user for whom the result is an authentication success. In addition, whether the hidden image H is visible or not is judged based on the existence or nonexistence of the adjustment of the light passing through the transmission unit 10 of the viewing apparatus 1, regardless of the type of the medium including the hidden image H. As described above, the viewing apparatus 1 of this embodiment can allow the hidden image H to be visible only to a legitimate user without being limited by a medium including the image.

Furthermore, the viewing apparatus 1 has the bar code reading unit 30 to obtain the adjustment parameter from the bar code B. This can consequently provide, based on the information on the medium, a correspondence between the hidden image provided in advance in the image on the medium and information related to the light adjustment for the hidden image.

Furthermore, in the authentication processing, the viewing apparatus 1 obtains the user information from the bar code B. Then, the viewing apparatus 1 judges whether the user judged by the CPU 41 to have an iris recognition success is included in the user information or not. This can consequently provide, based on the information on the medium, a correspondence between the hidden image provided in advance on the image on the medium and the user permitted to view the hidden image.

Furthermore, the adjustment parameter and the user information are information included in the bar code B. Therefore, the adjustment parameter and the user information can be easily recorded on the medium. Thus, the viewing apparatus 1 can use an existing bar code reading technique to easily obtain the adjustment parameter and the user information from the medium.

Furthermore, the adjustment parameter and the user information are encrypted. This can consequently provide both of an easy obtainment of the adjustment parameter and the user information from the medium, and the prevention of the unfair use of these pieces of information.

Furthermore, the viewing apparatus 1 performs the iris recognition processing and the user authentication based on the result of the iris recognition processing. This can consequently provide a very accurate user authentication based on the biological information of the user.

Furthermore, the frames 50 having an eyeglasses frame shape are used to hold the transmission unit 10 just in front of the eyes of the user. This can consequently maintain a fixed distance between the transmission unit 10 and the user eyes, thus more accurately reflect the judgment by the CPU 41 showing whether the hidden image is visible or not depending on the result of the adjustment of the light of the transmission unit 10.

The present invention is not limited to the above respective embodiments. The present invention may be subjected to various improvement and design change within a range not deviating from the intention.

For example, the transmission unit may take other forms so long as having a configuration providing light adjustment.

An example of the transmission unit having another configuration includes a method of using a transmissive filter structure using liquid crystal. In this case, the CPU 41 is used to control the operation of the configuration to change the light transmission in liquid crystal accommodated in a filter or a filter using liquid crystal (e.g., a liquid crystal shutter). This control is used to adjust the amount or angle of the light passing through the transmission unit. This can consequently achieve a greater variety of light adjustment patterns.

Another example of the transmission unit having another configuration includes a method of using both of a lenticular lens and a blocking member, such as a shutter.

Figure 7:
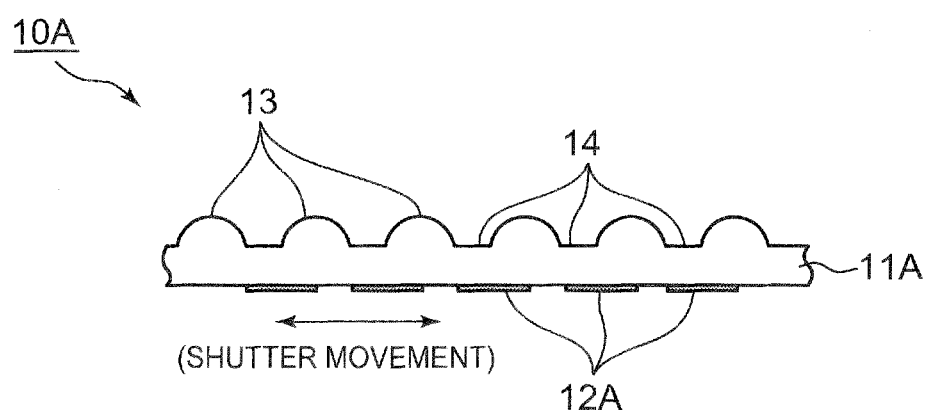
FIG. 7 illustrates an example of a transmission unit using both of a lenticular lens and a blocking member, such as a shutter.

FIG. 7 illustrates an example of the transmission unit 10A using both of a lenticular lens and a blocking member (e.g., a shutter).

The transmission unit 10A shown in FIG. 7 has: a lens unit 11A having a plurality of lenticular lens units 13; and the shutter 12A for limiting the path of the light L passing through the lens unit 11A.

The lens unit 11A has: the plurality of lenticular lens units 13 for bending light at a predetermined angle; and flat plate units 14 that are provided in between the lenticular lens units 13 and that prevents light orthogonal to the plane thereof from being bended. The lenticular lens unit 13 is a convex lens having a semicylindrical cross section as shown in FIG. 7. The width obtained by halving the semicylindrical shape equals to the width of the flat plate unit 14 at one position.

The shutter 12A is a slit-like blocking member whose position changes with respect to the lens unit 11A. One of the slits has a width that is two times wider than the width of the flat plate unit 14 at one position (i.e., the width equal to that of the semicylindrical shape of one lenticular lens unit 13).

Figure 8A:
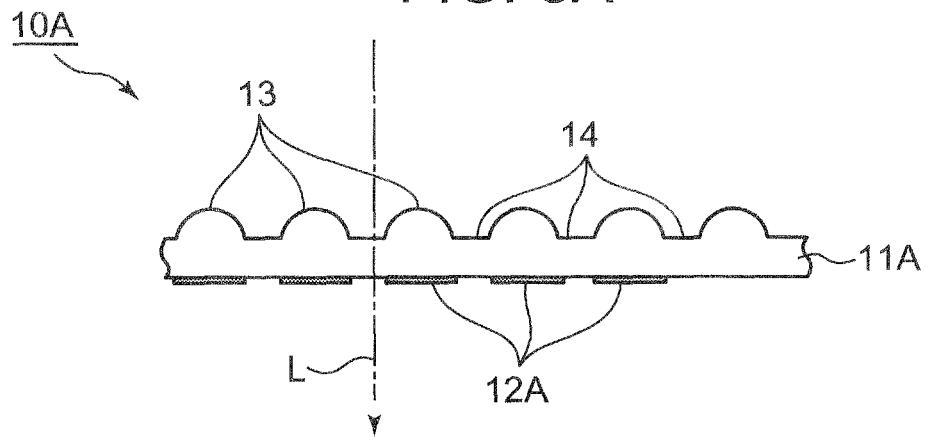
FIG. 8A illustrates an example of a position pattern of the shutter in the transmission unit shown in FIG. 7, and shows a case where a flat plate unit is used as an optical path.
Figure 8B:
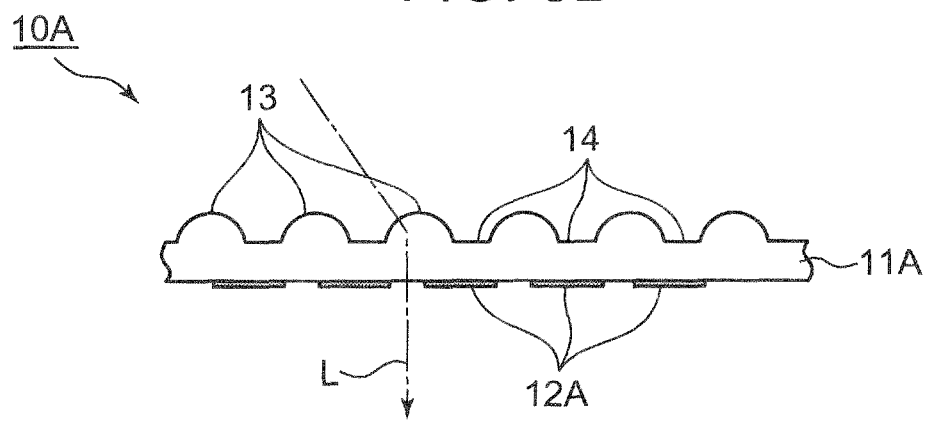
FIG. 8B illustrates an example of the position pattern of the shutter in the transmission unit shown in FIG. 7, and shows a case where one of parts obtained by halving the semicylindrical shape of the lenticular lens unit is used as an optical path.
Figure 8C:
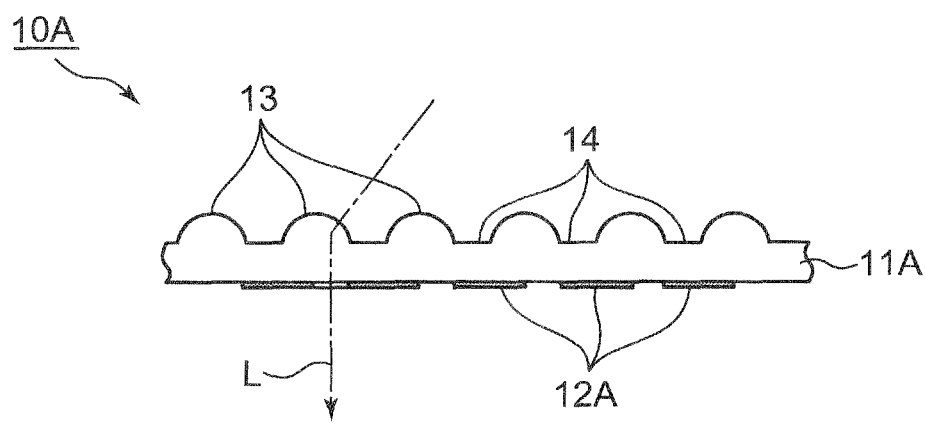
FIG. 8C illustrates an example of the position pattern of the shutter in the transmission unit shown in FIG. 7, and shows a case where the other of parts obtained by halving the semicylindrical shape of the lenticular lens unit is used as an optical path.

The CPU 41 causes a change in position of the shutter 12A to thereby change the path of the light L passing through the transmission unit 10A. Specifically, the CPU 41 causes the path of the light L passing through the transmission unit 10A to be: the flat plate unit 14; one of parts obtained by halving the semicylindrical shape of the lenticular lens unit 13; or the other of the parts obtained by halving the semicylindrical shape of the lenticular lens unit 13. As a result, as shown in FIG. 8A to FIG. 8C, the angle of the light L passing through the transmission unit 10A is changed.

Figure 9A:
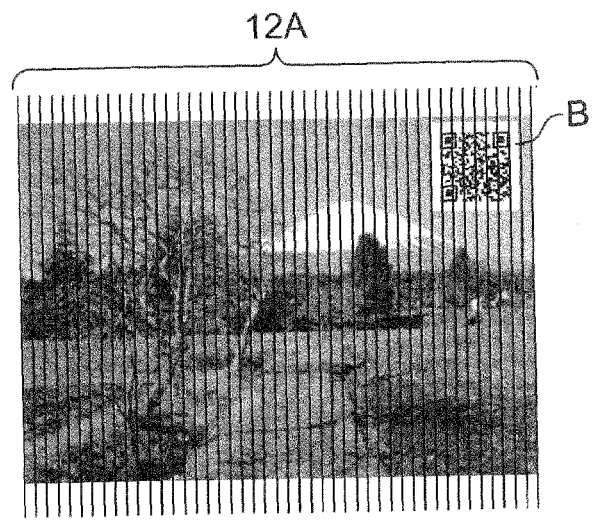
FIG. 9A illustrates an example of a visible image when the optical path shown in FIG. 8A is used.
Figure 9B:
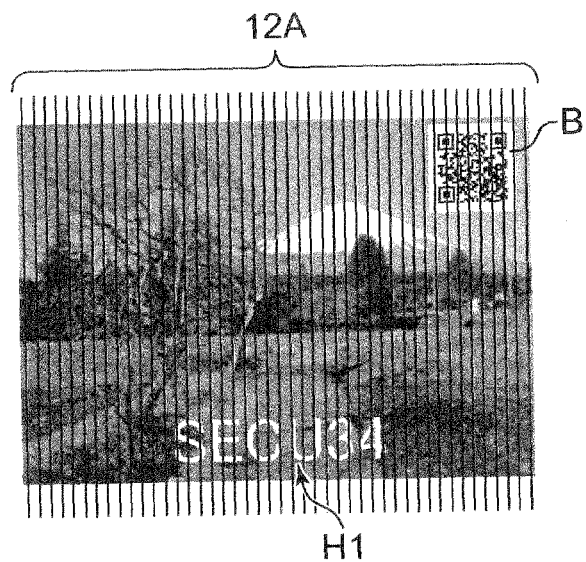
FIG. 9B illustrates an example of a visible image when the optical path shown in FIG. 8B is used.
Figure 9C:
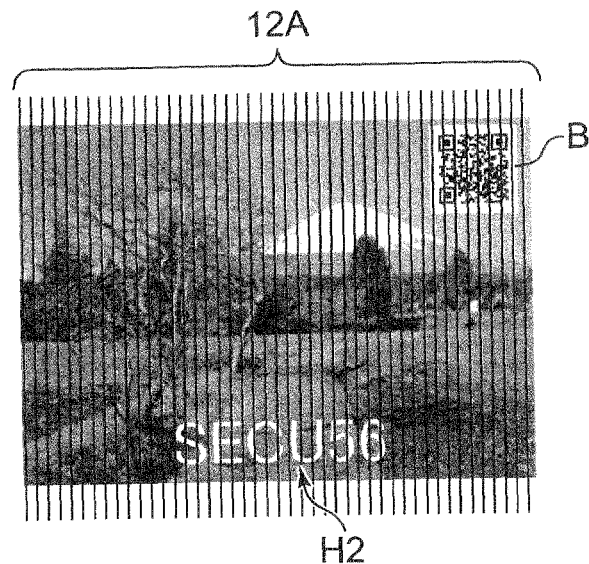
FIG. 9C illustrates an example of a visible image when the optical path shown in FIG. 8C is used.

For example, the first legitimate user is allocated with the angle of the light L of one of the parts obtained by halving the semicylindrical shape of the lenticular lens unit 13. The second legitimate user different from the first user is allocated with the angle of the light L of the other of the parts obtained by halving the semicylindrical shape of the lenticular lens unit 13. When the authentication processing is not yet completed or results in an authentication failure, the path of the light L is set be the flat plate unit 14. As a result, as shown in FIG. 9A to FIG. 9C, hidden images H1 and H2 can be set to be individually visible for a plurality of users.

In the examples shown in FIG. 8A to FIG. 8C and FIG. 9A to FIG. 9C, adjustment parameters depending on a plurality of users can be easily obtained by causing the bar code B to include adjustment parameters depending on the angles of the lights L used for the respective plurality of users.

Alternatively, a plurality of users (e.g., the first and second users) are collectively used as a usage right group so that a plurality of users correspond to each usage right group. This can consequently allow the viewing apparatus 1 to be shared by more users. The users are not limited to the first user and the second user. Thus, three or more users or usage right groups may also be set.

The obtainment of the user information and the adjustment parameter is not limited to the one using a two-dimensional bar code. The obtainment may also be achieved by, for example, a one-dimensional bar code or other embedded information. The embedded information including the bar code B is not limitedly provided on a medium including a hidden image and may be separately provided from the image.

The bar code B and the bar code reading unit 30 can be omitted. In this case, the verification processing based on user information is omitted. The adjustment parameter is stored in the ROM 43 for example in advance.

The user authentication may also be performed based on other than a picked-up image of iris. For example, an authentication may also be carried out based on a picked-up image of retina, a fingerprint, other biological information or non-biological information.

The light adjustment is not limited to the angle of the light passing through the transmission unit. For example, whether the hidden image can be visible may also be switched based on a position or an angle of a filter allowing the light of a specific color (spectrum) to pass therethrough or a change in the transmission color by the combination of a plurality of such filters.

The viewing apparatus 1 in the above-described embodiment has an eyeglasses-like shape. However, the invention is not limited to this. The invention may also take other configuration including, for example, a configuration of a magnifying glass for example to support the glass by a hand or other holding mechanisms, or a configuration using a sheet or a binder that can be placed on a medium such as paper.

As described above, some embodiments of the present invention have been described. However, the scope of the present invention is not limited to the above-described embodiments, and includes the scope of the inventions as described in the claims and the equivalent scope thereof.

What is claimed is:

1. A viewing apparatus through which an image is viewed, the apparatus comprising:
    a transmission unit having light transparency;
    an identification information obtaining unit which obtains identification information from a user of the viewing apparatus in a state in which the user is using the viewing apparatus, to identify the user of the viewing apparatus, wherein the identification information obtaining unit is arranged to face a side of the user of the viewing apparatus;
    a user information obtaining unit which obtains user information from the image, and which is arranged to face a side opposite the user of the viewing apparatus, wherein the user information indicates a user who has permission to view a hidden image included in advance in the image; and
    a processor which performs: (i) authentication processing which authenticates the user of the viewing apparatus based on the identification information obtained from the user of the viewing apparatus; (ii) judgment processing which, if the user of the viewing apparatus is authenticated in the authentication processing, judges whether the hidden image included in advance in the image can be viewed by the user of the viewing apparatus or not, wherein the judgment processing judges that the hidden image can be viewed by the user of the viewing apparatus when the user of the viewing apparatus who was authenticated in the authentication processing is included in the user information obtained from the image by the user information obtaining unit; and (iii) adjustment processing which adjusts light passing through the transmission unit to switch whether the hidden image can be viewed or not, based on a result of the judgment processing.

2. The viewing apparatus according to claim 1, wherein the processor adjusts an angle of the light passing through the transmission unit between the user of the viewing apparatus and the image to switch whether the hidden image can be viewed or not, in the adjustment processing.

3. The viewing apparatus according to claim 2, further comprising a correspondence information obtaining unit which obtains correspondence information from the image showing a correspondence between a user included in the user information and the angle of the light, and
    wherein in the adjustment processing, the angle of the light passing through the transmission unit between the user of the viewing apparatus and the image is adjusted based on the correspondence information if the user of the viewing apparatus is authenticated in the authentication processing and is included in the user information obtained from the image by the user information obtaining unit.

4. The viewing apparatus according to claim 1, wherein the user information is included in a bar code, and the user information obtaining unit reads the bar code to obtain the user information.

5. The viewing apparatus according to claim 1, wherein the user information is partially or entirely encrypted.

6. The viewing apparatus according to claim 1, wherein the identification information obtaining unit comprises an image pick-up unit which is arranged to face the side of the user of the viewing apparatus and which obtains a picked-up image of an iris of an eye of the user of the viewing apparatus as the identification information to identify the user of the viewing apparatus; and
    wherein the processor further performs: (i) storage processing which stores an iris image of an eye of a user who is permitted in advance to view the hidden image as a permission image, and (ii) processing, in the authentication processing, which authenticates the user of the viewing apparatus based on the identification information obtained from the user of the viewing apparatus, and the permission image.

7. The viewing apparatus according to claim 1, wherein the viewing apparatus further includes a holding unit which holds the transmission unit in front of eyes of the user of the viewing apparatus.

8. The viewing apparatus according to claim 7, wherein the holding unit is an eyeglasses frame.

9. A viewing apparatus including a transmission unit having light transparency, through which an image is viewed, the viewing apparatus comprising:
    an identification information obtaining unit which obtains identification information from a user of the viewing apparatus in a state in which the user is using the viewing apparatus, to identify the user of the viewing apparatus, wherein the identification information obtaining unit is arranged to face a side of the user of the viewing apparatus;
    an authentication unit which authenticates the user of the viewing apparatus based on the identification information obtained from the user of the viewing apparatus;
    a user information obtaining unit which obtains user information from the image, and which is arranged to face a side opposite the user of the viewing apparatus, wherein the user information indicates a user who has permission to view a hidden image included in advance in the image;
    a judgment unit which, if the user of the viewing apparatus is authenticated by the authentication unit, judges whether the hidden image included in advance in the image can be viewed by the user of the viewing apparatus or not, wherein the judgment unit judges that the hidden image can be viewed by the user of the viewing apparatus when the user of the viewing apparatus who was authenticated by the authentication unit is included in the user information obtained from the image by the user information obtaining unit; and an adjustment unit which adjusts light passing through the transmission unit to switch whether the hidden image can be viewed or not, based on a result of the judgment unit.

10. The viewing apparatus according to claim 9, wherein the adjustment unit adjusts an angle of the light passing through the transmission unit between the user of the viewing apparatus and the image to switch whether the hidden image can be viewed or not.

11. The viewing apparatus according to claim 10, further comprising a correspondence information obtaining unit which obtains correspondence information from the image showing a correspondence between the user included in the user information and the angle of the light, wherein the adjustment unit adjusts the angle of the light passing through the transmission unit between the user of the viewing apparatus and the image based on the correspondence information if the user of the viewing apparatus is authenticated by the authentication unit and is included in the user information obtained from the image by the user information obtaining unit.

12. The viewing apparatus according to claim 9, wherein the user information is included in a bar code, and the user information obtaining unit reads the bar code.

13. The viewing apparatus according to claim 9, wherein the user information is partially or entirely encrypted.

14. The viewing apparatus according to claim 9, further comprising:

an image pick-up unit which obtains a picked-up image of an iris of an eye of the user of the viewing apparatus as the identification information, and a storage unit which stores an iris image of an eye of a user who is permitted in advance to view the hidden image as a permission image, wherein the identification information obtaining unit obtains the picked-up image as the identification information to identify the user of the viewing apparatus, and wherein the authentication unit authenticates the user of the viewing apparatus based on the identification information obtained from the user of the viewing apparatus, and the permission image.

15. The viewing apparatus according to claim 9, further comprising a holding unit which holds the transmission unit in front of eyes of the user of the viewing apparatus.

16. The viewing apparatus according to claim 15, wherein the holding unit is an eyeglasses frame.

17. A non-transitory computer-readable medium having stored thereon a program that is executable by a computer of a viewing apparatus including (i) a transmission unit having light transparency, through which an image is viewed, (ii) an identification information obtaining unit which obtains identification information from a user of the viewing apparatus in a state in which the user is using the viewing apparatus, to identify the user of the viewing apparatus, wherein the identification information obtaining unit is arranged to face a side of the user of the viewing apparatus, and (iii) a user information obtaining unit which obtains user information from the image, and which is arranged to face a side opposite the user of the viewing apparatus, wherein the user information indicates a user who has permission to view a hidden image included in advance in the image, the program being executable by the computer to cause the computer to perform processing comprising:

authentication processing which authenticates the user of the viewing apparatus based on the identification information obtained from the user of the viewing apparatus;

judgment processing which, if the user of the viewing apparatus is authenticated in the authentication processing, judges whether the hidden image included in advance in the image can be viewed by the user of the viewing apparatus or not, wherein the judgment processing judges that the hidden image can be viewed by the user of the viewing apparatus when the user of the viewing apparatus who was authenticated in the authentication processing is included in the user information obtained from the image by the user information obtaining unit; and adjustment processing which adjusts light passing through the transmission unit to switch whether the hidden image can be viewed or not, based on a result of the judgment processing.

18. The viewing apparatus according to claim 1, wherein a plurality of hidden images are included in advance in the image, wherein the user information obtaining unit obtains user information indicating a plurality of users who have permission to view at least one of the hidden images included in advance in the image, wherein the viewing apparatus further comprises an adjustment parameter obtaining unit which obtains adjustment parameters specific to each user included in the user information, and wherein when the judgment processing judges that the user of the viewing apparatus who was authenticated in the authentication processing is included in the user information, the processor performs processing in the adjustment processing which adjusts light passing through the transmission unit according to the obtained adjustment parameters specific to the user of the viewing apparatus who is included in the user information and who was authenticated in the authentication processing, such that the authenticated user of the viewing apparatus can view only the hidden image or images for which the user has permission to view according to the obtained user information, and cannot view other hidden images included in the image.

19. The viewing apparatus according to claim 9, wherein a plurality of hidden images are included in advance in the image, wherein the user information obtaining unit obtains user information indicating a plurality of users who have permission to view at least one of the hidden images included in advance in the image, wherein the viewing apparatus further comprises an adjustment parameter obtaining unit which obtains adjustment parameters specific to each user included in the user information, and wherein, when the judgment unit judges that the user of the viewing apparatus who was authenticated by the authentication unit is included in the user information, the adjustment unit adjusts light passing through the transmission unit according to the obtained adjustment parameters specific to the user of the viewing apparatus who is included in the user information and who was authenticated by the authentication unit, such that the authenticated user of the viewing apparatus can view only the hidden image or images for which the user has permission to view according to the obtained user information, and cannot view other hidden images included in the image.

20. The non-transitory computer-readable medium according to claim 17,
   wherein a plurality of hidden images are included in advance in the image,
   wherein the user information obtaining unit obtains user information indicating a plurality of users who have permission to view at least one of the hidden images included in advance in the image,
   wherein the viewing apparatus further comprises an adjustment parameter obtaining unit which obtains adjustment parameters specific to each user included in the user information, and
   wherein when the judgment processing judges that the user of the viewing apparatus who was authenticated in the authentication processing is included in the user information, the program causes the computer to perform processing in the adjustment processing which adjusts light passing through the transmission unit according to the obtained adjustment parameters specific to the user of the viewing apparatus who is included in the user information and who was authenticated in the authentication processing, such that the authenticated user of the viewing apparatus can view only the hidden image or images for which the user has permission to view according to the obtained user information, and cannot view other hidden images included in the image.

* * * * *